US010360880B2

(12) United States Patent
Navarro et al.

(10) Patent No.: US 10,360,880 B2
(45) Date of Patent: Jul. 23, 2019

(54) PERCUSSIVE INSTRUMENT MALLET

(71) Applicant: D'Addario & Company, Inc., Farmingdale, NY (US)

(72) Inventors: Elijah Navarro, Ronkonkoma, NY (US); Esteban Rodriguez, Laurel Hollow, NY (US); Richard Douglas Stillwell, Melville, NY (US)

(73) Assignee: D'Addario & Company, Inc., Farmingdale, NY (US)

( * ) Notice: Subject to any disclaimer, the term of this patent is extended or adjusted under 35 U.S.C. 154(b) by 16 days.

(21) Appl. No.: 15/967,634

(22) Filed: May 1, 2018

(65) Prior Publication Data

US 2018/0322852 A1    Nov. 8, 2018

Related U.S. Application Data

(60) Provisional application No. 62/502,048, filed on May 5, 2017.

(51) Int. Cl.

| G10D 13/00 | (2006.01) |
| B29C 45/14 | (2006.01) |
| B29C 45/34 | (2006.01) |
| B29L 31/00 | (2006.01) |
| B29K 101/12 | (2006.01) |

(52) U.S. Cl.
CPC ..... G10D 13/003 (2013.01); B29C 45/14065 (2013.01); B29C 45/345 (2013.01); *B29C 2045/14131* (2013.01); *B29K 2101/12* (2013.01); *B29L 2031/758* (2013.01)

(58) Field of Classification Search
CPC .. G10D 13/021; G10D 13/003; B29C 45/345; B29C 45/14065; B29C 2045/14131; B29K 2101/12; B29L 2031/758
See application file for complete search history.

(56) References Cited

U.S. PATENT DOCUMENTS

| 7,439,434 B1 | 10/2008 | Cole et al. | |
| 2009/0000460 A1* | 1/2009 | Lento | G10D 13/003 |
| | | | 84/422.4 |

\* cited by examiner

*Primary Examiner* — Kimberly R Lockett
(74) *Attorney, Agent, or Firm* — Alix, Yale & Ristas, LLP

(57) ABSTRACT

A percussive instrument mallet includes a molded head, a shaft having an optionally threaded nose, and a rigid insert fixed completely within the head. The insert has an inner profile including threads or other protrusions that mate with the nose of the shaft, and an outer profile that is embedded in the mold material. An outer portion of the insert includes a weighting ring that is also embedded in the mold material. The method includes selecting a tool with an optionally threaded nose and a central bore, threading or otherwise securing an insert onto the nose of the tool, supporting a weight ring on the insert; placing the threaded insert and weight ring in a mold, molding the head while over-molding the weight ring and insert, drawing air out of the head through the central bore, disengaging the tool from the insert, and attaching a mallet shaft into the insert.

20 Claims, 5 Drawing Sheets

PERCUSSIVE INSTRUMENT MALLET

CROSS-REFERENCE TO RELATED APPLICATION

This is a non-provisional application claiming priority to U.S. Provisional Application No. 62/502,048, filed May 5, 2018, the entire contents of which are hereby incorporated by reference.

BACKGROUND

The present invention relates to percussive instrument mallets and a method of manufacture thereof, and in particular a mallet with shaft attached to an embedded insert.

Instrument mallets typically have a shaft and a head, and are available in many forms to be played on many kinds of percussive instruments such as assorted drums (marching, tympani, orchestral), xylophone, marimba, vibraphone, bells and the like.

Many mallets, especially those with relatively small shafts (i.e., under 0.5 inches) include a shaft inserted directly into a drilled head which is secured by a nail, screw, adhesive or combination. Mallet heads vary across a wide gamut of shapes, materials and constructions. Heads can be wood, plastic, rubber, felt, and other materials. Often the mallet head is wrapped over with other materials such as yarns or felts. The shafts also vary, with assorted types of wood, plastic, rattan and fiberglass being common. The drilled hole is of similar size to the shaft. Optionally, a lead body or similar weighting member can be added into the hole before the shaft is attached to increase the mass of the mallet head.

A somewhat common drawback of these types of instrument mallets is failure of the connection between the head and shaft after a period of use, thereby allowing the head to come loose from the shaft and rendering the mallet unusable. Additionally, if present, the nail or screw can split the wooden shaft, also leading to failure of the mallet. Glued variations carry additional drawbacks in that many desirable mallet head materials are difficult to adhere to due to their required elasticity and the heavy repeated impacts the mallet must withstand during normal use. This can make it difficult to sufficiently bond a threaded insert into the head to improve the connection.

One attempt to improve the construction of such mallets is disclosed in U.S. Pat. No. 7,439,434. This patent teaches a composite head formed by molding a thermoplastic material completely around a hollow metal insert that is plugged in the mold. After the mold is opened and over-molded plug is withdrawn to reveal the composite head, a shaft is inserted and glued into the insert. The composite head is then wrapped with a resilient material such as yarn. This technique is not amenable to producing composite heads with easily varying head weights. To maintain a good connection between the shaft and insert based on a constant shaft penetration, the size of the insert must vary commensurate with the size of the weight placed within the insert before the shaft is connected.

SUMMARY

It would be useful to have a percussive instrument mallet that reduces or eliminates the drawbacks identified above, and offers substantial and facile variation in size, shape and other physical properties. The inventive disclosed embodiments improve the connection between the head and the shaft, especially for mallets where the head or core of the head is formed of a molded material, more particularly a polymeric material, and even more particularly a thermoplastic material.

Disclosed herein is a mallet with a head with a rigid insert fixed within an over-molded material, comprising a shaft penetrating the head, the insert having an inner profile including threads that mate with the shaft.

Preferably, an inner profile of the insert includes threads that self-tap to the shaft when the shaft is forced into the insert.

The insert is embedded in the head by over-molding during the molding of the head. The insert becomes completely contained and secured within the surrounding molded material to form the head. The molded material can be selected from any number of materials and durometers, as required or desired by the end use. Polymeric materials are preferred, with thermoplastic being particularly preferred.

The insert can include features to ensure a more secure bond into the molded material and to allow a more secure bond to the shaft. The final mallet construction has been found to be significantly more durable than previous designs used in the musical instrument accessories industry. Testing has shown conventional mallets failing at as low as 45 lbs. pulling force, whereas an example of a comparable model (size and configuration) of the presently disclosed mallet has been shown to hold at up to 300 lbs. pulling force.

Of additional note is the manner that added weight can be incorporated into the composite head. Cylindrical weights can be fit over the insert and included in the over-molding process to be molded together within the material. This construction insures that the added weight is secure and also allows for much larger, heavier weights to be incorporated into the head because the weight need not fit into the small shaft bore. This provides a vast array of weighting options and also eliminates the need to use lead or other heavy metals that can be considered hazardous.

The mallet of a preferred embodiment includes a head comprising a cured polymeric material with a rigid insert, a shaft having a nose penetrating the head along a shaft axis. The rigid insert is fixed within the polymeric material coaxially around the nose of the shaft. The insert has an inner profile including threads that rigidly mate with either a threaded surface or self-tapped nose of the shaft, and an outer profile that is embedded in the cured polymeric material. An outer portion of the insert includes a distinct or integrated weighting ring that is also embedded in the cured polymeric material. Preferably, the polymeric material is a thermoplastic.

In an embodiment, the inner profile of the insert is tapered to promote a more secure and concentric assembly of the shaft to the head. The insert is made of a material that is rigid yet relatively easy to bond to both internally (to the shaft) and externally (to the molded material), and which may include a polymeric material or coating such as nylon. The internal profile can have a coarse thread to improve the adhesive bonding to the shaft and also aid in the removal of any trapped air during the assembly process. This also allows easier assembly of concentric mallets without the need for special tooling.

An associated method of manufacturing a weighted mallet includes as a first step, threading or otherwise securing the insert onto the nose of a special tool, which may be threaded with threads similar in configuration to the threads of the shaft, or another complementary shape. The tool has a cavity that extends through the tip of the nose, and an external shoulder providing an abutment surface at the base of the nose. The insert is placed over the nose of the tool and a weighting member or ring is placed on a support surface of the insert. The upper end of the tool with insert and weight ring, is then placed in a mold whereby an injected polymeric material, such as a thermoplastic, over-molds and thus surrounds and embeds the weight ring and insert. Any air is drawn out of the polymeric material through a porous vent tube that protrudes through a hole at the top of the insert, into a cavity of the tool, and is expelled through venting cross holes in the tool. After the polymeric material sets, the tool is disengaged from the embedded insert, and the nose of the mallet shaft is secured to the threads of the insert.

It should thus be appreciated that the connection of the shaft to the composite head is further improved relative to similar known mallets by the internal threads in the insert, augmented by a bonding agent. Also, manufacturing costs and efficiency are improved significantly by using the same insert to externally support a variety of weight rings, without other changes to the manufacturing process.

BRIEF DESCRIPTION OF THE DRAWING

A representative embodiment of the invention is described herein with reference to the accompanying drawing, in which.

DETAILED DESCRIPTION

Figure 1:
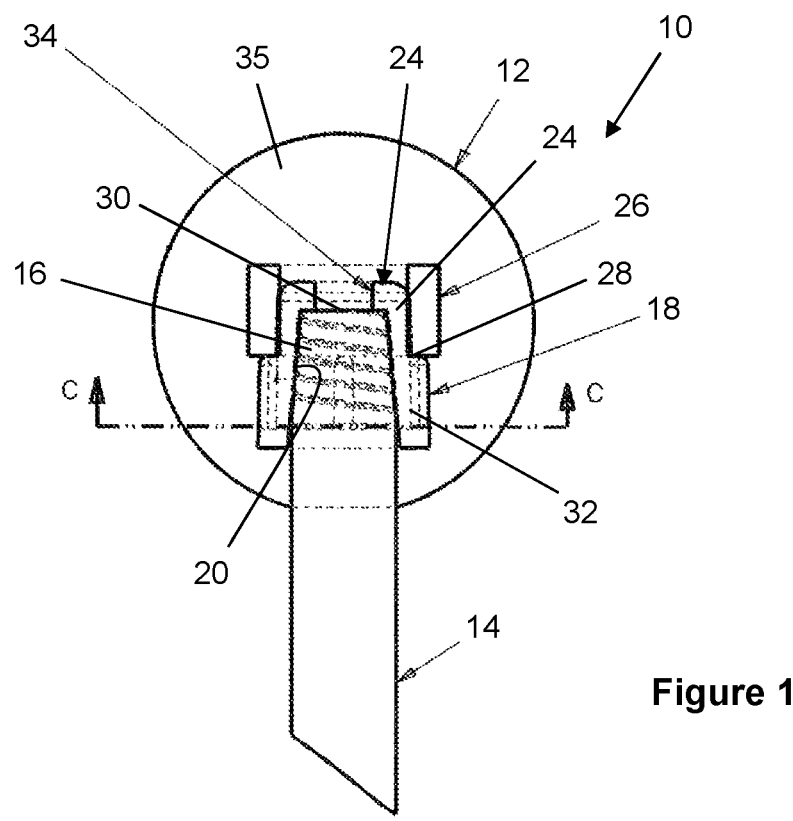
FIG. 1 is a schematic view of the completed mallet.
Figure 2:
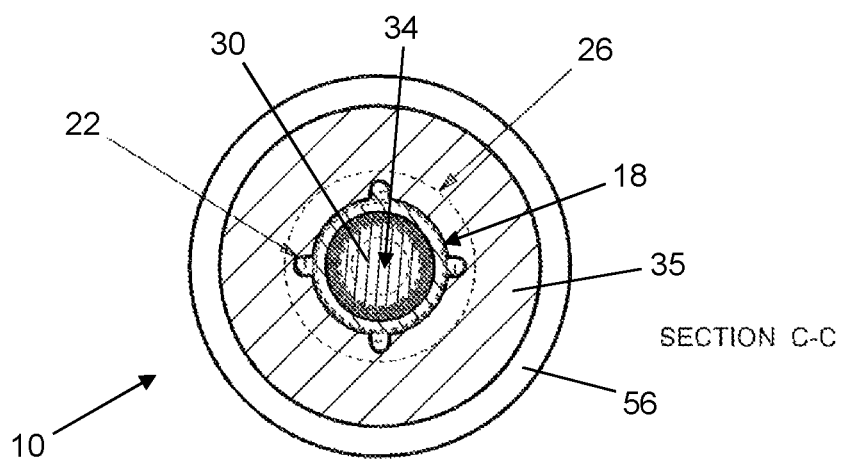
FIG. 2 is cross section view of the insert showing the engagement of the anti-spin ribs with the cured head material.

FIGS. 1 and 2 show a representation of an internally weighted mallet 10, having a head 12, a shaft 14 with nose 16 penetrating the head 12. The head includes an embedding 35 over a rigid insert 18 that is fixed. The insert 18 preferably has an inner profile including threads 20 that rigidly mate with the nose 16 of the shaft 14. A preferred embodiment of the head 12 comprises an embedding 35 formed from a cured thermoplastic material. With reference to FIG. 2, the insert 18 has an outer profile that is embedded in the cured thermoplastic material 35 to resist rotation, such as with radially extending ribs 22 that fix the insert 18 within the head 12. The terms "thermoplastic material" and "embedding" are used herein, however, it should be understood that the embedding layer is not necessarily limited to a thermoplastic. The inventive concepts described herein extend to other curable polymeric materials, including for example, catalytic curing polymeric materials.

The depicted insert 18 has an outer profile with an upper portion 24 for optionally supporting a distinct mallet weighting member 26 within the head 12. In the depicted embodiment, the insert 18 defines an intermediate support surface 28 formed as an annular shoulder and the weighting member 26 is supported on the shoulder. In one particularly preferred embodiment depicted herein, the support surface 28 is formed as an external annular shoulder and the weighting member 26 is formed as a cylindrical weight ring mated with the shoulder. The contour of the support surface 28 and weighting member 26 of this preferred embodiment are non-limiting, as other shapes can be employed, such as for example mating hexagonal surfaces on the external upper portion of the insert and inside of the weight ring and/or a weighting member 26 a non-circular cross-section.

For purposes that will be described below primarily with respect to a preferred method of manufacture, the nose 16 of the shaft 14 has a tip 30 and the insert 18 includes an upper end 24 that partially covers the tip 30. As shown in the depicted preferred embodiment of FIG. 1, the upper end 24 is formed as an inwardly extending annular shoulder that defines a through opening 34 at the tip 30.

The configuration of the preferred embodiment may alternatively be characterized as the insert 18 having an outer profile that includes a lower portion 32 with protrusions 22 that engage the cured thermoplastic material 35 that forms the head 12 to thereby fix the insert 18 against rotation within the head 12. A central portion of the insert 18 includes a support surface 28 that engages a distinct weighting member 26. An upper surface 24 of the insert 18 partially covers the tip 30 of the nose 16, leaving a substantially central opening 34 on the axis of the shaft 14 at the tip 30.

Notably, in the inventive configuration of the mallet described herein with a distinct weighting member 26 engaged with an insert 18, a single configuration of uniform insert 18 can be used with a variety of weighting members 26 having different masses. Thus, a seemingly unlimited number of different weight percussion mallets may be manufactured with many identical parts, elements or sub-elements. A less adjustable, but even more robust alternative suitable for the manufacture of a large number of identical mallets includes a weight member (of any shape) that is integrally formed with the insert as a single unitary element.

With reference primarily to FIGS. 3-5 and 8, an associated method of manufacturing a weighted mallet like that depicted generally as reference numeral 10 is described and shown. First, the insert 18 is threaded onto a nose 38 at the distal end of a special elongated tool 36 (step A in FIG. 8). The tool 36 has a central (axial) bore 40 that extends through the tip of the nose 38, and an external shoulder 42 at the base of the nose 38. In a preferred practice, the insert 18 is threaded over the nose of the tool, with the tool shoulder 42 as a stop. A weighting member 26 (i.e., annular ring) is thereafter placed on the shoulder 28 of the insert 18 (step B). The distal end 39 of the tool 36 with threaded insert 18 and weighting member 26 is then placed in a mold 44.

Figure 3:
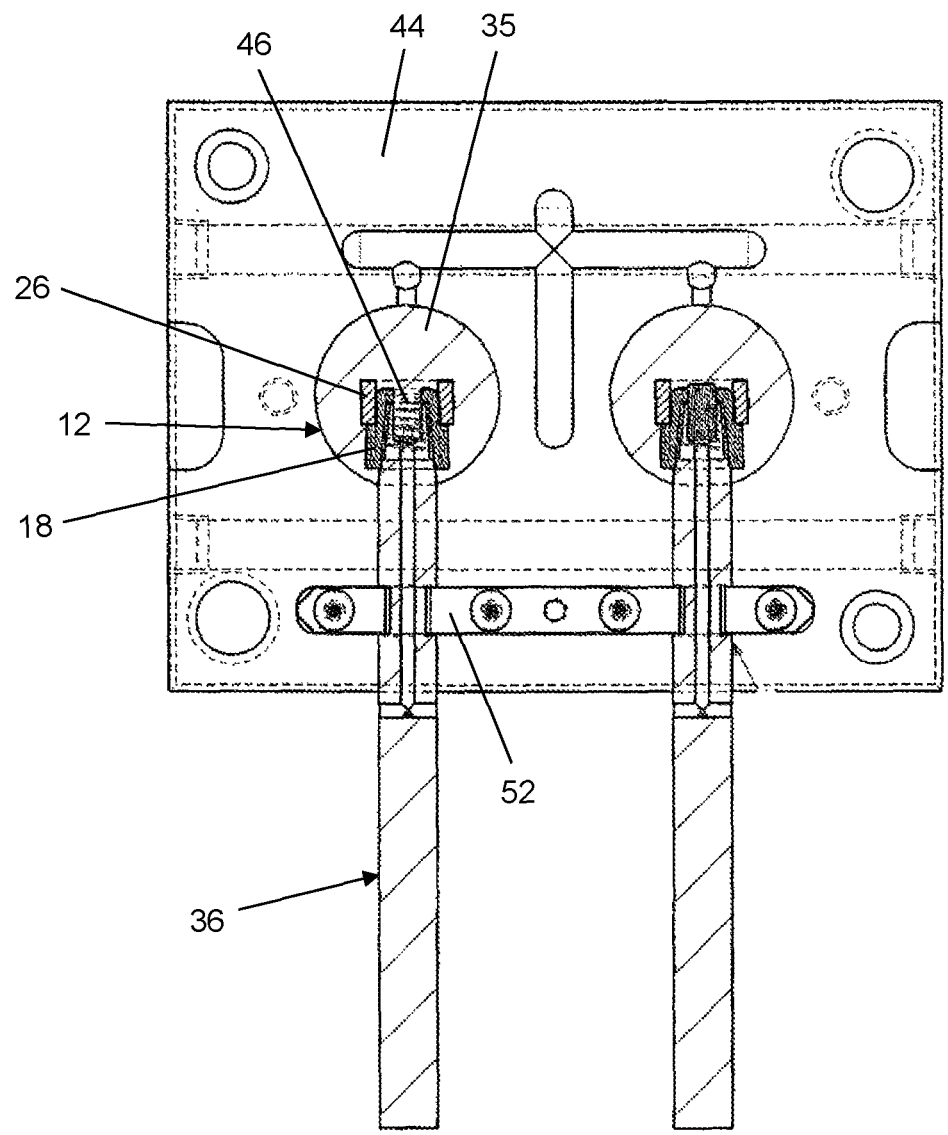
FIG. 3 is schematic of the molding system adapted for over-molding the mallet head onto the insert using a special tool.
Figures 4, 5:
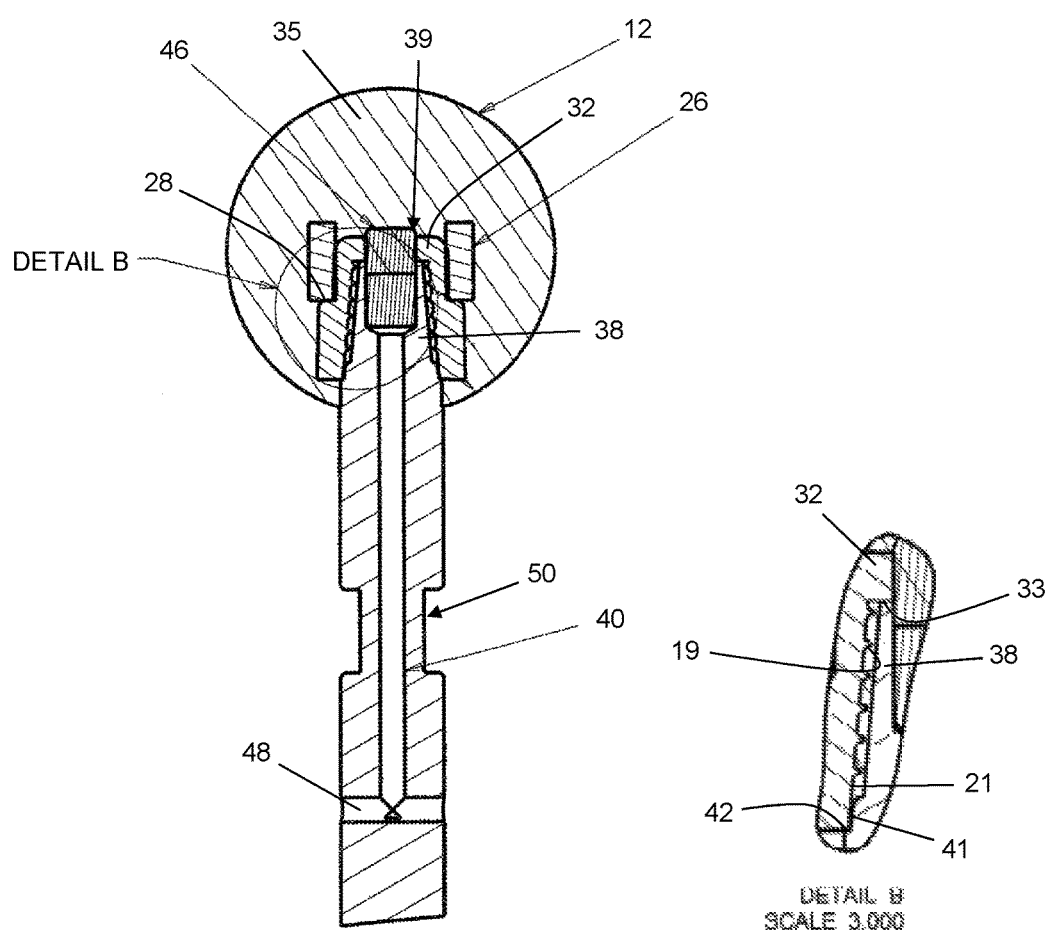
FIG. 4 is a view of the tool nose with insert and weighting ring in the thermoplastic material of the head during manufacture.
FIG. 5 is a detail of the preferred engagement between the nose of the molding tool and the inside of the insert.

A polymeric material 35 (preferably a thermoplastic) is injected into the mold 44 to over-mold, and thus surround the weighting member 26 and insert 18 (step C). The retention shoulder 28 at the bottom of the insert 18 is included within the over-molded thermoplastic material, thereby forming the composite head 12 of the mallet 10. Air present in the mold is displaced by the polymeric material 35 and drawn out through a porous vent tube 46 at the distal tip of the tool 36 that protrudes through the central through opening 34 at the top of the insert 18, partially into the cavity 40 of the tool, and is expelled through venting cross holes 48 in the tool (step D). The described configuration of the vent tube 46 and cavity 40 and cross holes 48 has been shown to provide a robust mallet head 12 compared to known techniques that necessarily trap air between components. In the preferred embodiment of the tool shown in FIGS. 3 and 4, the cavity 40 is configured as a central bore. Additionally, the porous vent tube 46 is made from a material with pores having size and configuration to allow air to pass through into the cavity 40, but without allowing the polymeric material 35 to pass. As seen in FIGS. 3 and 4, the depicted tool 36 can also include locking notch 50 configured to engage a mating member 52 on the mold fixture 44 to assure that the tool is inserted a precise predetermined distance into the mold 44 before the molten thermoplastic material 35 is injected to form the head 12.

The thermoplastic material is allowed to set with the tool 36 remaining engaged with the insert 18 (step E). Once the thermoplastic is set, the tool is unscrewed or otherwise withdrawn from the embedded insert 18 (step F), and the nose 16 of the mallet shaft 14 is threaded or otherwise forced into the embedded insert 18 to form the mallet 10 (step G), which is thereafter released from the mold 44 (step H).

In a preferred embodiment of the mallet 10, the inside of the insert 18 and nose 16 of the shaft 14 both have a complimentary tapered contour whereby even a nose of a shaft with a smooth outer surface forced against the threaded insert produces a self-tapping interference fit. More generally, a shaft with a smooth nose can be "self-tapped" in a rigid connection to radially inward extending projections within the insert. Alternatively, the nose of the shaft and the insert can both be threaded without taper. The anti-spinning ribs, like those shown as reference numeral 22 in FIGS. 2 and 6, prevent rotation of the insert 18 relative to the over-molded material 35 during both unscrewing of the tool 36 in step F and screwing or twisting-in of the shaft 14 in step G, as well as during use of the mallet 10. The nose 16 of the shaft 14 and/or the threads 19 of the insert 18 can be covered with an adhesive before mating to provide an enhanced attachment.

FIGS. 4 and 5 depict an embodiment in which the insert 18 is partially threaded for ultimate threaded engagement with the shaft 14 (whether or not self-tapped), while also being adapted for interference fit with the nose 38 of the molding tool 36. As shown most clearly in the enlarged view of FIG. 5, the depicted insert 18 includes dual helix threads 19 configured for self-tapping to the shaft 14. The threads 19 fade out toward the larger (bottom) opening of the rigid insert 18, providing a smooth unthreaded lower seal surface 21 for an interference fit seal with the tool 36. The threads 19 are radially recessed in the inner surface of the insert 18 relative to an upper annular seal surface 33 defined by the upper end 32. The lower seal surface 21 captures the venting material tube 46, and the upper seal surface 33 captures the annular base 41 of the nose 38 on the tool 36. This purely axially activated relationship improves manufacturing efficiency by allowing a quicker engagement and disengagement of the tool 36 with insert 18 immediately before and immediately after the over-molding process. As shown most clearly in FIG. 5, the lower portion of the insert 18 cooperates with the outer contour of the base 41 of the nose of the tool to seal radially and axially against the shoulder 42 of the tool 36.

Figure 6:
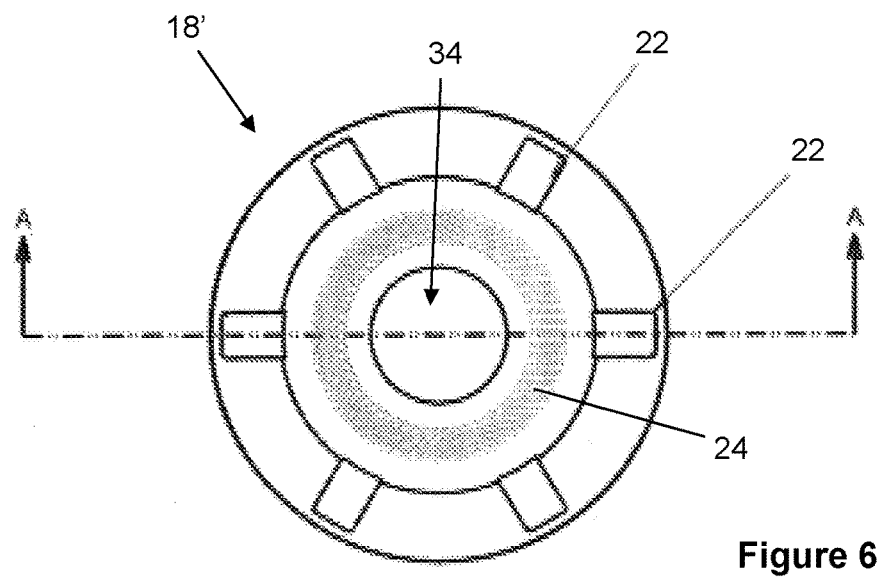
FIGS. 6 and 7 show a variation wherein the inside of the insert has a series of circular protrusions rather than threads.
Figure 7:
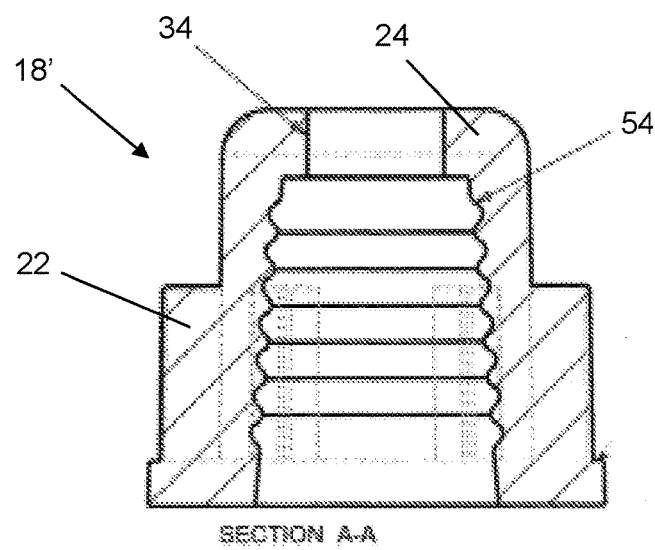
Figure 8:
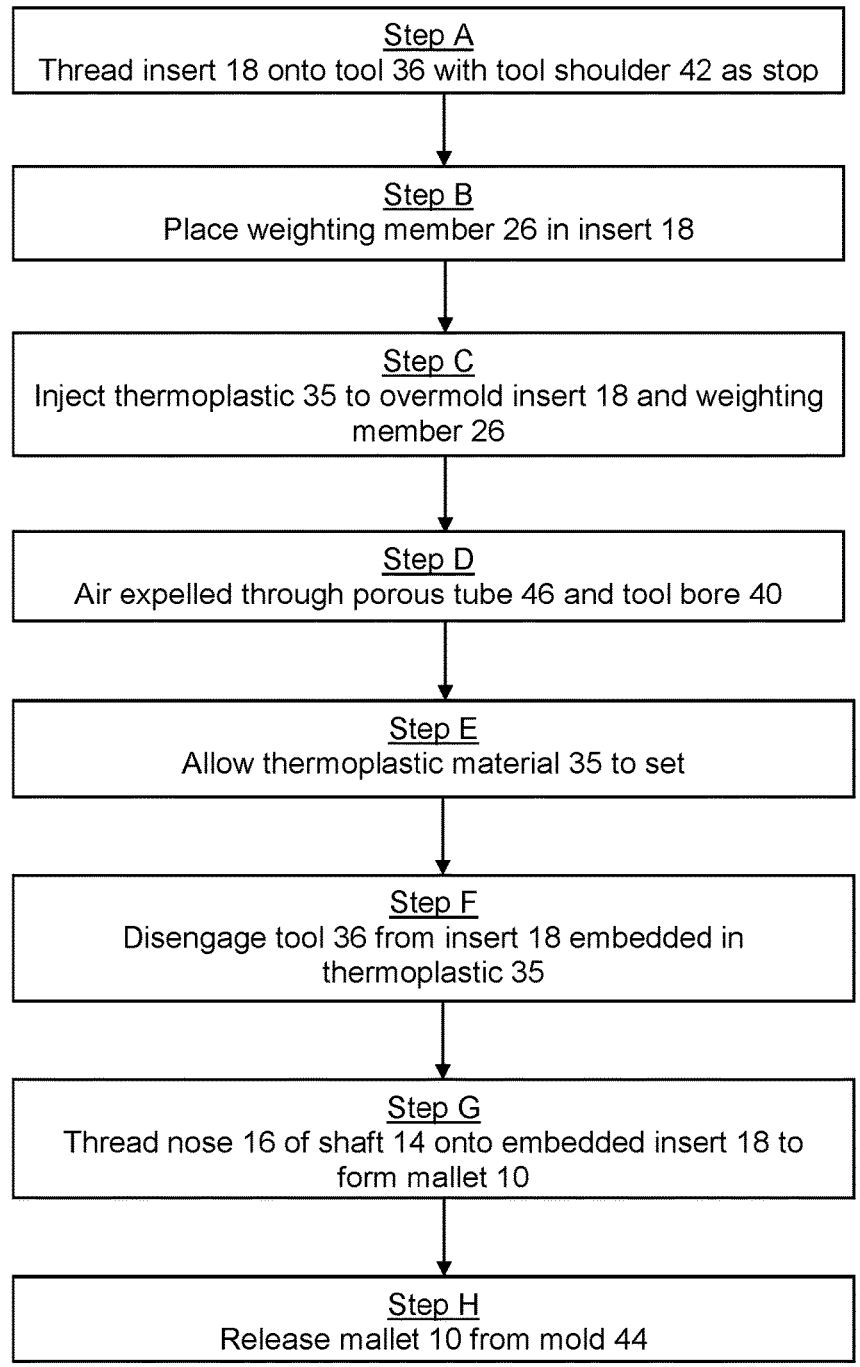
FIG. 8 is a flowchart showing the general steps of the disclosed method of manufacturing a percussive mallet.

FIGS. 6 and 7 show an alternate embodiment wherein the tapered inside surface of the insert 18' includes a series of substantially circular protrusions 54 rather than threads. This embodiment of the insert 18' can be secured to the molding tool 36 via interference fit (similar to the configuration described with respect to FIGS. 4 and 5), and a smooth tapered nose of a shaft 14 can later be secured to the insert 18' via force-fit deformation optionally enhanced with adhesive.

A mallet with the composite head (insert and over-mold) and attached shaft can be used a finished product as-is. However, as is well-known in the musical instrument arts, one or more layers of another material can be applied over the composite head to achieve custom performance characteristics. For example, yarn, felt, or other similar material, represented generally as reference numeral 56 in FIG. 2, wrapped around the thermoplastic embedding layer.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A percussive instrument mallet comprising:
   a layer of cured thermoplastic material;
   a rigid insert fixed completely within the cured thermoplastic material, the insert defining an inner profile including a portion with threading; and
   a shaft penetrating the cured thermoplastic material and insert, having a nose that rigidly mates with the threads of the insert.

2. The mallet of claim 1, wherein the insert has an outer profile that includes outwardly extending ribs that assist in fixing the insert within the thermoplastic material and preventing movement of the insert relative to the thermoplastic material.

3. The mallet of claim 1, wherein the insert has an outer profile that supports a distinct weighting member within the thermoplastic material.

4. The mallet of claim 1, wherein
   an outer profile of the insert defines a shoulder; and
   a distinct mallet weighting member is supported on the shoulder within the thermoplastic material.

5. The mallet of claim 1, wherein
   the nose has a distal tip;
   the insert has an upper end that covers the tip; and
   the upper end defines a through opening.

6. The mallet of claim 1, wherein
   the nose has a distal tip; and
   the insert has an outer profile with a lower portion including protrusions that engage the cured thermoplastic material and thereby fix the insert against rotation relative to the thermoplastic material, an intermediate portion including a support surface engaging a distinct weighting member, and an upper portion that at least partially covers the tip of the nose.

7. The mallet of claim 1, wherein the insert has a tapered inner surface and the nose of the shaft is tapered with interference fit within the insert.

8. The mallet of claim 1, wherein an adhesive bonds the threads of the insert to the nose of the shaft.

9. The mallet of claim 7, wherein an adhesive bonds the threads of the insert to the nose of the shaft.

10. The mallet of claim 1, wherein the inner profile of the insert has a tapered surface and the nose of the shaft is tapered with a self-tapping interference fit within the insert.

11. A percussive instrument mallet comprising:
    a mallet head comprising:
       a cured polymer material; and
       a rigid insert fixed within the polymer material having an exterior with profile that is embedded within the cured polymer material and an inner profile, the insert including a weighting ring embedded in the cured polymer material; and a shaft including a nose penetrating the head along a shaft axis, wherein the rigid insert is rigidly fixed to the shaft coaxially around said nose.

12. The mallet of claim 11, wherein the weighting ring is integral with the insert.

13. The mallet of claim 11, wherein the weighting ring is a distinct member surrounding the insert substantially coaxial to the insert and shaft.

14. The mallet of claim 11, wherein the inner profile of the insert comprises threads and the nose of the shaft rigidly mates with the threads in the insert.

15. The mallet of claim 11, wherein the shaft has a distal nose that is self-tapped in a rigid connection to radial projections in the inner profile of the insert.

16. The mallet of claim 11, wherein the polymer material is a thermoplastic.

17. The mallet of claim 11, comprising an adhesive between the insert and the nose of the shaft.

18. A method for manufacturing a percussive instrument mallet having a head and a shaft, comprising:
    selecting a tool that has a nose at a distal end and a cavity that extends through the nose;
    attaching a hollow insert onto the nose of the tool;
    placing a weighting member on an exterior support surface of the insert;
    placing the nose of the tool with insert and weight ring in a mold;
    injecting a polymeric material into the mold to thereby over-mold and surround the weight ring and insert;
    drawing air out of the polymeric material through the cavity of the tool;
    allowing the polymeric material to set to form the mallet head with embedded insert and weighting member;
    after the polymeric material sets, disengaging the tool from the insert; and
    securing a shaft into the insert embedded within the polymeric material to form the mallet.

19. The method of claim 18, wherein the insert defines an interior with a threaded region that is recessed relative to an upper seal surface at a distal portion of the interior and a lower seal surface at a proximal portion of the interior; and the nose of the tool is placed within the insert by insertion with clearance between the nose and the threads, creating an interference fit between the nose and the respective seal surfaces on the insert.

20. The method of claim 18, wherein the insert has an inner surface that defines threading;

the nose of the tool is threaded; and the tool is placed within the insert with a threaded fit between the nose of the tool and the insert.

* * * * *